(12) United States Patent
Eineborg

(10) Patent No.: US 12,198,715 B1
(45) Date of Patent: Jan. 14, 2025

(54) SYSTEM AND METHOD FOR GENERATING IMPULSE RESPONSES USING NEURAL NETWORKS

(71) Applicant: Treble Technologies, Reykjavík (IS)

(72) Inventor: Martin Eineborg, Gardabaer (IS)

(73) Assignee: TREBLE TECHNOLOGIES, Reykjavik (IS)

( * ) Notice: Subject to any disclaimer, the term of this patent is extended or adjusted under 35 U.S.C. 154(b) by 0 days.

(21) Appl. No.: 18/388,694

(22) Filed: Nov. 10, 2023

(30) Foreign Application Priority Data

Sep. 11, 2023 (EP) ..................................... 23196535

(51) Int. Cl.
*G10L 25/30* (2013.01)
*G06N 3/0455* (2023.01)

(52) U.S. Cl.
CPC ............ *G10L 25/30* (2013.01); *G06N 3/0455* (2023.01)

(58) Field of Classification Search
CPC .............................. G10L 25/30; G06N 3/0455
See application file for complete search history.

(56) References Cited

U.S. PATENT DOCUMENTS

| 6,826,483 B1 | 11/2004 | Anderson et al. |
| 9,383,464 B2 | 7/2016 | Shin |

(Continued)

FOREIGN PATENT DOCUMENTS

| WO | WO-2022167720 A1 | 8/2022 |

OTHER PUBLICATIONS

Abadi, M. et al, TensorFlow: A system for large-scale machine learning, Proceedings of the 12th USENIX conference on Operating Systems Design and ImplementationNov. 2016, pp. 265-283.
(Continued)

*Primary Examiner* — Michael N Opsasnick
(74) *Attorney, Agent, or Firm* — COATS & BENNETT, PLLC

(57) ABSTRACT

A method for generating an impulse response representing a sound wave propagation from at least one sound source received at a listening point in a room includes obtaining the generated impulse response at the listening point in the room from a neural network architecture by providing at least the position of the listening point as input. The generated impulse response is generated using a neural network architecture. The network is trained by obtaining a 3D model of the room including the at least one sound source emitting sound in the room and obtaining a training group of simulated impulse responses, wherein each simulated impulse response is generated for a respective predefined listening point in the 3D model of the virtual room. An autoencoder is trained by training an encoder of the autoencoder by using the training group of simulated impulse responses as input in order to obtain a corresponding training group of compressed simulated impulse response as outputs and training a decoder of the autoencoder by using the training group of compressed impulse responses as input in order to obtain a corresponding training group of uncompressed simulated impulse response as outputs. An IR neural network is trained using the training group of compressed simulated impulse responses of the autoencoder and the corresponding position of the predefined listening points as input.

20 Claims, 5 Drawing Sheets

(56) References Cited

U.S. PATENT DOCUMENTS

| | | | |
|---|---|---|---|
| 9,560,467 | B2 | 1/2017 | Gorzel et al. |
| 9,711,126 | B2 | 7/2017 | Mehra et al. |
| 10,440,498 | B1 | 10/2019 | Gari et al. |
| 10,559,295 | B1 | 2/2020 | Abel |
| 10,777,214 | B1 | 9/2020 | Shi et al. |
| 10,897,570 | B1 | 1/2021 | Robinson et al. |
| 10,986,444 | B2 | 4/2021 | Mansour et al. |
| 11,830,471 | B1 | 11/2023 | Mansour et al. |
| 2011/0015924 | A1* | 1/2011 | Gunel Hacihabiboglu ............... G10L 21/0272 704/E15.001 |
| 2015/0110310 | A1 | 4/2015 | Minnaar |
| 2020/0214559 | A1 | 7/2020 | Krueger et al. |
| 2020/0395028 | A1* | 12/2020 | Kameoka ............... G06N 3/044 |
| 2021/0074282 | A1* | 3/2021 | Borgstrom ............. G10L 25/84 |
| 2021/0074308 | A1* | 3/2021 | Skordilis ............... G06N 3/045 |
| 2021/0136510 | A1 | 5/2021 | Tang et al. |
| 2022/0051479 | A1 | 2/2022 | Agarwal et al. |
| 2022/0079499 | A1* | 3/2022 | Doron .................... G06N 3/04 |
| 2022/0101126 | A1* | 3/2022 | Bharitkar ............... H04S 7/303 |
| 2022/0327316 | A1 | 10/2022 | Grauman et al. |
| 2022/0405602 | A1* | 12/2022 | Yoo ....................... G06N 3/088 |
| 2023/0164509 | A1* | 5/2023 | Sporer .................... H04S 3/008 381/309 |
| 2023/0197043 | A1* | 6/2023 | Martinez Ramirez ....................... G06N 3/084 381/61 |
| 2023/0362572 | A1 | 11/2023 | Jang et al. |

OTHER PUBLICATIONS

Dozat, T. Incorporating Nesterov Momentum into Adam, Proceedings of the 4th International Conference on Learning Representations, Workshop Track, San Juan, Puerto Rico, May 2-4, 2016, pp. 1-4.

Käser, M. et al, An arbitrary high-order discontinuous Galerkin method for elastic waves on unstructured meshes—I. The two-dimensional isotropic case with external source terms, Geophys. J. Int. (2006) 166, 855-877.

Majumder, S. et al, Few-Shot Audio-Visual Learning of Environment Acoustics, 36th Conference on Neural Information Processing Systems (NeurIPS 2022).

Melander, A. et al, Massively parallel nodal discontinuous Galerkin finite element method simulator for room acoustics, The International Journal of High Performance Computing Applications.

Pind Jörgensson, F. K, Wave-Based Virtual Acoustics. Technical University of Denmark, (2020), 194 pages.

Pind, F. et al, Time-domain room acoustic simulations with extendedreacting porous absorbers using the discontinuous Galerkin method, J. Acoust. Soc. Am. 148, 2851-2863 (2020).

Ratnarajah, A. et al, IR-GAN: Room impulse response generator for far-field speech recognition, INTERSPEECH 2021, 22nd Annual Conference of the International Speech Communication Association, Brno, Czechia, Aug. 30-Sep. 3, 2021.

Reed, W. H. and Hill, T. R. 1973. "Triangular mesh methods for the neutron transport equation", Los Alamos Scientific Laboratory, pp. 1-23 Oct. 31, 1973.

Richard, A. et al, Deep Impulse Responses: Estimating And Parameterizing Filters With Deep Networks, arXiv:2202.03416v1 [cs. SD] Feb. 7, 2022.

Singh, S. et al, Image2Reverb: Cross-Modal Reverb Impulse Response Synthesis, arXiv:2103.14201v2 [cs.SD] Aug. 13, 2021.

N. Ketkar and N. Ketkar, "Introduction to keras," Deep learning with python: a hands-on introduction, pp. 97-111, 2017.

Ahrens, J. et al., "Computation of Spherical Harmonics Based Sound Source Directivity Models from Sparse Measurement Data", Forum Acusticum, Dec. 7-11, 2020, pp. 2019-2026,HAL open science.

Anonymous, "Hybrid Model for Acoustic Simulation" May 15, 2021, pp. 1-6, XP93044320, obtained from Internet: https://reuk.github.io/wayverb/hybrid.html.

Aretz, M., "Combined Wave And Ray Based Room Acoustic Simulations Of Small Rooms", Logos Verlag Berling GmbH, Sep. 2012, pp. 1-211.

Atkins, H.L et al, "Quadrature-Free Implementation of Discontinuous Galerkin Method for Hyperbolic Equations", AIAA Journal vol. 36, No. 5, May 1998, pp. 775-782, Downloaded by North Dakota State University.

Bank, D. et al., "Autoencoders", Version 2, Submitted Apr. 3, 2021, pp. 1-22, Obtained from Internet: https://arxiv.org/abs/2003.05991v2.

Bansal, M. et al., "First Approach to Combine Particle Model Algorithms with Modal Analysis using FEM", Conventional Paper 6392, AES Convention 118, May 28-31, 2005, Barcelona, Spain, pp. 1-9, AES.

Berland, J. et al, "Low-dissipation and low-dispersion fourth-order Runge-Kutta algorithm", Computers & Fluids 35.10, 2006, pp. 1459-1463.

Bilbao, S. et al., "Local time-domain spherical harmonic spatial encoding for wave-based acoustic simulation", IEEE Signal Processing Letters, 26.4, Mar. 1, 2019, pp. 617-621, obtained from Internet: https://www.research.ed.ac.uk/en/publications/local-time-domain-spherical-harmonic-spatial-encoding-for-wave-ba.

Cosnefroy, M. "Propagation of impulsive sounds in the atmosphere: numerical simulations and comparison with experiments", Partly in French, PhD thesisPHD thesis, École Centrale de Lyon, Submitted Dec. 18, 2019, pp. 1-222.

Denk, F. et al, "Equalization filter design for achieving acoustic transparency in a semi-open fit hearing device", Speech Communication; 13th ITG-Symposium, Oct. 10-12, 2018, Oldenburg, Germany, pp. 226-230.

Pind, F. et al., "A novel wave-based virtual acoustics and spatial audio framework", Audio Engineering Society Conference Paper, AVAR Conference, Richmond, VA, Aug. 15-17, 2022, pp. 1-10, AES.

Dragna, D. et al "A generalized recursive convolution method for time-domain propagation in porous media", The Journal of the Acoustical Society of America 138.2, published online Aug. 20, 2015, pp. 1030-1042, https://doi.org/10.1121/1.4927553, Acoustical Society of America.

Funkhouser, T., "Survey of Methods for Modeling Sound Propagation in Interactive Virtual Environment Systems", Department of Computer Science of Princeton University, Jan. 1, 2003, pp. 1-53, XP055746257.

Gabard, G. et al."A full discrete dispersion analysis of time-domain simulations of acoustic liners with flow", Manuscript, Journal of Computational Physics 273, Received date Nov. 25, 2013, Accepted date May 2, 2014, pp. 1-22, 10.1016/j.jcp.2014.05.004.

Hart, C. et al., "Machine-learning of long-range sound propagation through simulated atmospheric turbulence", article, The Journal of the Acoustical Society of America, American Institute of Physics, vol. 149, No. 6, published online Jun. 21, 2021, pp. 4384-4395, XP012257489.

Hesthaven, J.S. et al, "Nodal Discontinuous Galerkin Methods, Algorithms, Analysis, and Applications", Texts in Applied Mathematics, Chapter 3, pp. 1-507, Springer, New York, 2008.

Hu, F.Q. et al., "Low-dissipation and low-dispersion Runge-Kutta schemes for computational acoustics", Article No. 0052, Journal of Computational Physics 124, 1996, received Dec. 23, 1994, Revised Jul. 1995, pp. 177-191, Academic Press, Inc.

Jameson, A. et al "Solution of the Euler equations for complex configurations", 6th Computational Fluid Dynamics Conference, paper No. 83-1929, pp. 1-11, 1983, American Institute of Aeronautics and Astronautics (AIAA), https://doi.org/10.2514/6.1983-1929.

Sakamoto, S. et al., "Directional sound source modeling by using spherical harmonic functions for finite-difference time-domain analysis", Proceedings of Meetings on Acoustics, vol. 19, 2013, ICA 2013 Montreal, Jun. 2-7, 2013, pp. 1-9, Acoustical Society of America.

Yeh C-Y. et al., "Wave-ray coupling for interactive sound propagation in large complex scenes", ACM Transactions on Graphics, ACM, NY, US, vol. 32, No. 6, Article 165, Nov. 2013, pp. 1-11, XP058033914.

(56) References Cited

OTHER PUBLICATIONS

Kuttruff, H., "Room Acoustics: 6th edition", Dec. 10, 2019, pp. 1-302, CRC Press.
Yeh C-Y. et al., "Using Machine Learning to Predict Indoor Acoustic Indicators of Multi-Functional Activity Centers", Article, Applied Sciences, vol. 11, No. 12, Submitted May 28, 2021; Published Jun. 18, 2021, pp. 1-24, Obtained online: https://doi.org/10.3390/app11125641.
Xu, Z. et al, "Simulating room transfer functions between transducers mounted on audio devices using a modified image source method", J. Coust. Soc. Am., Sep. 8, 2023, Submitted Sep. 7, 2023, arXiv:2309.03486 [eess.AS], Cornell University Library.
Miccini, R. et al., "A hybrid approach to structural modeling of individualized HRTFs", 2021 IEEE Conference on Virtual Reality and 3D User Interfaces Abstracts and Workshops (VRW), Mar. 27, 2021, pp. 80-85, IEEE.
Milo, A. et al., "Treble Auralizer: a real time Web Audio Engine enabling 3DoF auralization of simulated room acoustics designs", Presented at conference 2023 Immersive and 3D Audio: from Architecture to Automotive (I3DA), Sep. 5-7, 2023, Bologna, Italy, pp. 1-8, 10.1109/I3DA57090.2023.10289386.
Moreau, S. et al. ,"Study of Higher Order Ambisonic Microphone", CFA/DAGA'04, Strasbourg, Mar. 24-25, 2004, pp. 215-216.
Wang, H. et al., "An arbitrary high-order discontinuous Galerkin method with local time-stepping for linear acoustic wave propagation", The Journal of the Acoustical Society of America 149.1, publication date Jan. 25, 2021, pp. 569-580.
Pind, F. et al, "A phenomenological extended-reaction boundary model for time-domain wave-based acoustic simulations under sparse reflection conditions using a wave splitting method", preprint submitted to Applied Acoustics Aug. 4, 2020, published Jan. 2021, vol. 172, 107596, pp. 1-29, DTU Library.
Strøm, E. et al., "Massively Parallel Nodal Discontinous Galerkin Finite Element Method Simulator for Room Acoustics", Master thesis, Apr. 2020, pp. 1-133, Technical University of Denmark.
Pind, F. et al, "Time-domain room acoustic simulations with extended-reacting porous absorbers using the discontinuous Galerkin method", The Journal of the Acoustical Society of America 148.5, Nov. 24, 2020, pp. 2851-2863.
Wang, H. et al., "Time-domain impedance boundary condition modeling with the discontinuous Galerkin method for room acoustics simulations", The Journal of the Acoustical Society of America 147.4, 2020, pp. 2534-2546, Acoustical Society of America.
Savioja, L. et al, "Overview of geometrical room acoustic modeling techniques", J. Acoust. Soc. Am., 138, published online Aug. 10, 2015, pp. 708-730.
Thomas, M.R.P., "Practical Concentric Open Sphere Cardioid Microphone Array Design For Higher Order Sound Field Capture", ICASSP 2019—2019 IEEE International Conference on Acoustics, Speech and Signal Processing (ICASSP), pp. 666-670, IEEE.
Rumelhart, D.E. et al, "Learning Internal Representations by Error Propagation", Parallel Distributed Processing: Explorations in the Microstructure of Cognition: Foundations, Chapter 8, 1987, pp. 318-362, MIT Press.
Sakamoto, S. et al, "Calculation of impulse responses and acoustic parameters in a hall by the finite-difference time-domain method", Acoust. Sci. & Tech. 29, 4, 2008, accepted Feb. 1, 2008, pp. 256-265, The Acoustical Society of Japan.
Sanaguano-Moreno, D.A. et al., "A Deep Learning approach for the Generation of Room Impulse Responses", 2022 Third International Conference of Information Systems and Software Technologies (ICI2ST), IEEE, Nov. 8, 2022, pp. 64-71, IEEE.
Rocchesso, D., "Maximally Diffusive Yet Efficient Feedback Delay Networks for Artificial Reverberation", Sep. 1997, pp. 1-4, vol. 4, No. 9, IEEE.

* cited by examiner

Train a multi-layer neural network to generate impulse responses at any position in the room using the plurality of simulated impulse responses

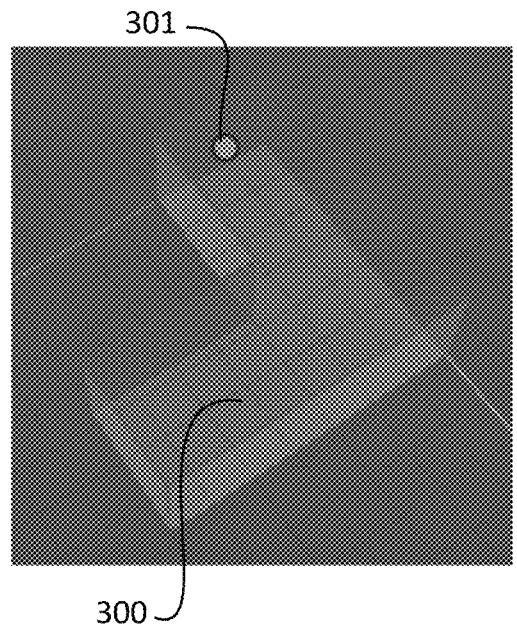
Fig. 3
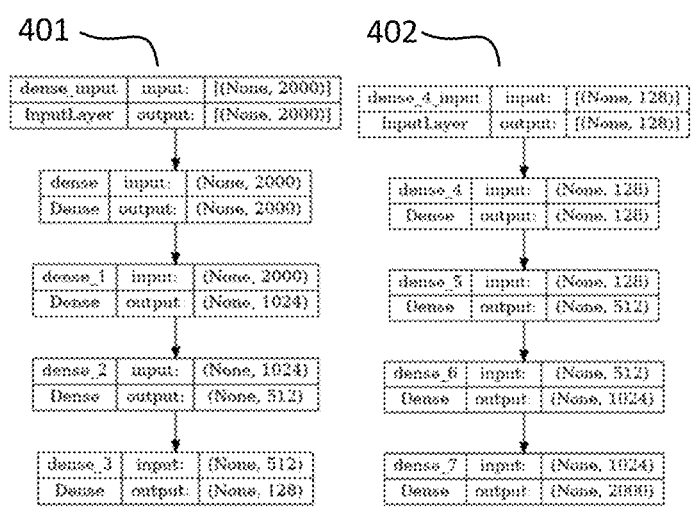
Fig. 4

SYSTEM AND METHOD FOR GENERATING IMPULSE RESPONSES USING NEURAL NETWORKS

CROSS-REFERENCE TO RELATED APPLICATIONS

The present application claims the benefit of European Patent Application No. 23196535.1, entitled "Generating impulse responses using neural networks" and filed on Sep. 11, 2023, which is hereby incorporated by reference herein in its entirety.

TECHNICAL FIELD

The current disclosure relates to a system and method of generating an impulse response using a neural network architecture. In particular, the system and method relate to generating an impulse response based on wave-based simulations.

BACKGROUND

Room Impulse Response (IR) captures the acoustic characteristics of an associated room and is affected by geometry, boundary materials, and objects within the room.

In particular, when simulating room acoustic in a virtual space, such as a digital 3D model of a room, being able to generate high fidelity IR signals for any given position in the room is a complicated problem. Storing all data points to cover a space, to be able to seamlessly move around, carries large data storage requirements and the solution is thus usually to store a number of IRs and interpolating between them as the listener moves around the room.

Moreover, generating high fidelity IR signals, in particular by using wave-based solvers, is resource and time consuming, which makes it further difficult to obtain real time audio feedback. One example of such a situation is in video game environments where a high degree of freedom for the user to move around in the room is desired.

SUMMARY

Thus, there exists a need for being able to provide high fidelity impulse responses in real time as a user moves around in a virtual room.

Accordingly, in a first aspect, there is disclosed a method of generating a signal impulse response representing a sound wave propagation from at least one sound source received at a listening point in a room.

The method comprises the steps of,
 obtaining the generated impulse response at the listening point in the room from a neural network architecture by providing at least the position of the listening point as input.

In a second aspect a method for generating a reverberating audio signal received at the listening point Is provided. The comprises the steps of obtaining a generated impulse response as described in relation to the first aspect. The method for generating a reverberating audio signal further comprises,
 obtaining an anechoic audio signal, and
 generating the reverberating audio signal received at the listening point by convolving the anechoic audio signal and the generated impulse response.

In a third aspect, which may be combined with the first or second aspect, as disclosed herein the generated impulse response is generated using a neural network architecture trained comprising the steps of,
 obtaining a 3D model of the room comprising the least one sound source emitting sound in the room,
 obtaining a training group of simulated impulse responses, wherein each simulated impulse response is generated for a respective predefined listening point in the 3D model of the virtual room,
 training an autoencoder comprising the steps of
  training an encoder of the autoencoder by using the training group of simulated impulse responses as input in order to obtain a corresponding training group of compressed simulated impulse response as outputs; and
  training a decoder of the autoencoder by using the training group of compressed impulse responses as input in order to obtain a corresponding training group of uncompressed simulated impulse response as outputs,
 training an IR neural network using the training group of compressed simulated impulse responses of the autoencoder and the corresponding position of the predefined listening points as input.

As will be understood and discussed herein, the above method of generating a reverberating audio signal is fast and provides a high fidelity reverberating audio signal based on a high fidelity impulse response generated by a neural network architecture. In particular in embodiments where the simulated impulse responses are generated using at least a wave based solver the increased high fidelity achieved by a wave based solver may be obtained while increasing the speed of the generation thereof considerably. The wave based solver can for example be based on the discontinuous Galerkin finite element method (DG/DGFEM) or a spectral element method (SEM), In particular in scenarios where rooms are pre-generated, e.g. in building planning, game design etc., the training as disclosed which is the time consuming part is done up front and as a user subsequently moves from listening point to listening point a new generated impulse response is generated almost instantly and convolved with the anechoic audio signal.

The disclosed method is particularly advantageous in relation to resource demanding simulation situation, for example when using wave based solvers. In embodiment, wave based solvers are used to simulate the impulse responses for the predefined listening points. This is typically a time consuming process. At least, it is not suited for real time rendering of sound. However, the wave based impulse responses has a high fidelity. As will be further shown, using a neural network architecture as shown above using the simulated impulse responses as training data it is possible to generate high fidelity impulse responses in real time. Thus, the method as disclosed herein allows for a faster and improved sound quality as known hitherto.

As discussed herein, the reverberating audio signal refers to an audio signal which takes into account room characteristics at a listening point in the room. This can be the actual signal heard or recorded at the listening point. Replicating or simulating a reverberating audio signal can for example be obtained by convolving an impulse response with an anechoic sound signal.

Moreover, each listening point in a room has its own impulse response. When referring to a listening point herein it should be understood as a listening point to which a user listening to the sound in room may move to or be at. This may for example be a predefined listening point, and as understood herein the method may at a predefined listening point use the impulse response simulated for that predefined listening point used for training, however, as this would require storing the impulse responses which may be quite substantial it is often more efficient to simply generate an impulse response for those positions as well when the method is applied.

The room may be a physical room or a virtual room. However, a 3D model of the room is needed in order to provide the simulation needed for training the neural network architecture. As mentioned, the method as well suited for gaming and building design.

For optimising existing rooms, e.g., concert venues, where the venue (room) can be scanned and then the method can be used to simulate visitors at the concert and understand how the sound experience will be in real time as the visitors move around. The position of the predefined listening points and the listening point is typically represented by a Cartesian coordinate X, Y, Z data set in relation to the 3D model of the room. Of course, other ways of representing the position of the listening point(s) may be implemented.

The anechoic audio signal should preferably not contain any reverberation information. However, in the context of the current disclosure the content and form of the anechoic audio signal is not very important but simply should be understood as being the sound emitted from the sound source. The sound source can be directional, omnidirectional etc.

As discussed herein different impulse responses (IRs) are referred to and is elaborated in the following, A generated impulse response is the impulse response that the method herein generates for the listening point. For example, the position of a player in a video game. As will be described the generated impulse response is typically generated by passing the compressed generated impulse response discussed below through the decoder of an autoencoder as discussed herein.

A simulated impulse response is the impulse response that is simulated for a predefined position in e.g., a simulation application or otherwise synthetically generated. As the simulated impulse response herein are used for training a neural network architecture a large number of simulated impulse responses for different predefined positions will typically be generated.

A compressed simulated impulse response refers to a simulated impulse response that has been passed through the encoder of an autoencoder and thus provides a latent space IR or latent space representation. The compressed simulated impulse response is used to further train the decoder of the autoencoder and the IR neural network.

A compressed generated impulse response refers to a latent space IR or latent space representation of the impulse response which is generated by the IR neural network. The compressed generated impulse response is typically based on at least the position of the listening point as input to the IR neural network. When considering a video game setting the IR neural network will generate the compressed generated impulse response as the player moves into a new position in the room in the game.

An uncompressed simulated impulse response refers to the simulated impulse response as it has been passed through the encoder of the autoencoder. Typically, in order to evaluate whether the autoencoder has been trained properly the simulated impulse response will be compared to the uncompressed simulated impulse response.

As will be discussed further the different impulse responses may be parts of a full impulse responses. For example, in some simulation and neural network architectures only relevant parts of the impulse response is determined. The relevant parts may be different depending on specific use cases. Thus, unless specifically stated a reference to an impulse response may encompass the full impulse response, at least a part of an impulse response, a first and/or a second part of an impulse response or other relevant sections thereof.

In one embodiment a set of simulated IRs are created by an acoustic simulation engine using a source and multiple receivers. The simulated IRs are then used to train an autoencoder to compress the simulated IRs to latent space representations which is used to train a fully connected multi-layer neural network to generate IRs for any given position in the room. As will be discussed it has been shown that generated IRs can thereby be predicted with minimal loss and significant reduction in size using autoencoders and neural networks Using an autoencoder network to train a neural network to reproduce the input by reconstructing it from an internal representation of much lower dimension increases the speed and thus the versatility of disclosed method. The latent space representation can be utilized as a way to represent the original signal in a compressed way.

The methods as described are preferable performed by a computer implemented method for generating an impulse response, a reverberating audio signal as discussed herein.

DETAILED DESCRIPTION

In one embodiment of a method for generating a reverberating audio signal, trained as disclosed herein, the steps of obtaining the generated impulse response further comprises the step of generating a compressed generated impulse response using the neural network, and comprises the step of generating the generated impulse response by using the decoder of the trained autoencoder to decompresses the compressed generated impulse response.

The processing and generation of a compressed generated impulse response is much faster as the neural network processes compressed data, also referred to as a lower dimension representation of the impulse response or the impulse response in latent space.

When training neural network architecture data is typically split up in training data and validation data, where the training data is used to train the network and the validation data is used for validating that the neural network has been properly trained. While validating it can for example be detected if the network has been overfitted, not trained sufficiently or otherwise trained in an inappropriate manner.

Thus, in one embodiment the steps of training the neural network architecture further comprises the step of, obtaining a validation group of simulated impulse responses, wherein each simulated impulse response is generated for a respective predefined listening point in the 3D model of the virtual room, wherein each of the simulated impulse responses are generated using at least a wave based solver, such as a DG solver, and a step of validating the autoencoder and the neural network using the validation group of simulated impulse responses, and that the validation group of simulated impulse responses is different from the training group of simulated impulse responses.

Different inputs can be used for training the neural network architecture. Generally using more input data for training may be one parameter for enabling better results of the network. It typically also requires a corresponding input when using the network.

For example in one embodiment the step of training the IR neural network comprises using the 3D model of the virtual room as input.

In another or additional embodiment the step of training the IR neural network comprises using the position and/or the directivity of at least one sound source as input.

The method for generating an impulse response as disclosed herein may comprise a first neural network architecture and a second neural network architecture, wherein the first neural network architecture uses a first group of datapoints of the simulated impulse response for training and the second neural network architecture uses a second group of datapoints of the simulated impulse response for training. Thus, when generating an impulse response, a first part of the generated impulse response is obtained based on the first neural network architecture and a second part of the generated impulse response is obtained based on the second neural network architecture. The first part and the second part of the generated impulse response may subsequently be combined to obtain the generated impulse response.

Thus, in one embodiment the method generates a first part of the generated impulse response using a first neural network architecture, corresponding to the neural network architecture discussed herein, wherein a first part of the simulated impulse responses is obtained and wherein the first part comprises a predetermined set of first data points. The predetermined set of first data points may for example correspond to a first, second and/or third reverberation of the simulated impulse response and may in some embodiments be represented by e.g. 2000 or more data points.

In a further embodiment the method generates a second part of the generated impulse response using a second neural network architecture, corresponding to the neural network architecture discussed herein, wherein a second part of the simulate impulse response are obtained and wherein the second part comprises a predetermined set of second data points. The predetermined set of second data points may for example correspond to the reverberation following the reverberation corresponding to the set of first data points.

The first part of the generated impulse response and the second part of the generated impulse response may be combined into a combined generated impulse response.

Creating different neural network architectures for different parts of the impulse response allows for customized optimization as some parts of the impulse response a high precision may be desired, while for other parts precision may be reduced or removed (i.e. not creating that part of the impulse response at all) in order to optimize the speed of the simulation of the simulated impulse responses or the speed of training the neural network architecture.

DESCRIPTION OF THE DRAWINGS

In the following embodiment and examples will be described in greater detail with reference to the accompanying drawings:

FIG. 3 shows an L-shaped room in which a generated IR is provided as disclosed herein, FIG. 4 shows the structure of an embodiment of an autoencoder as disclosed herein.

DETAILED DESCRIPTION OF THE DRAWINGS

Figure 1:
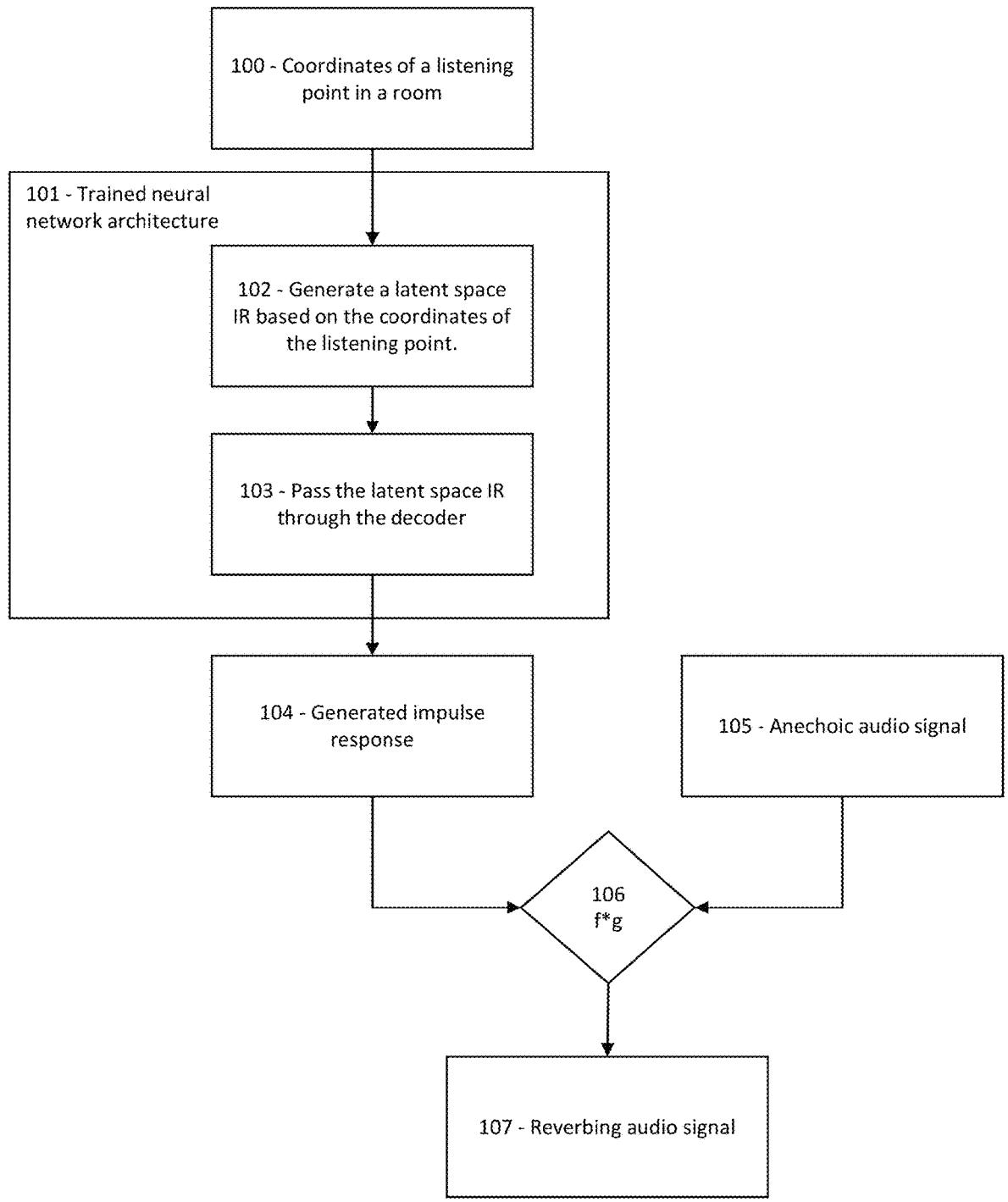
FIG. 1 shows a flow diagram of an embodiment of a method of generating a reverberating audio signal representing the sound from at least one sound source as disclosed herein.

In one embodiment of a method for generating a reverberating audio signal as discussed herein is described with respect to FIG. 1. This can for example be a situation where a user wearing a virtual reality headset is positioned in a virtual room at a listening point.

Figure 2:
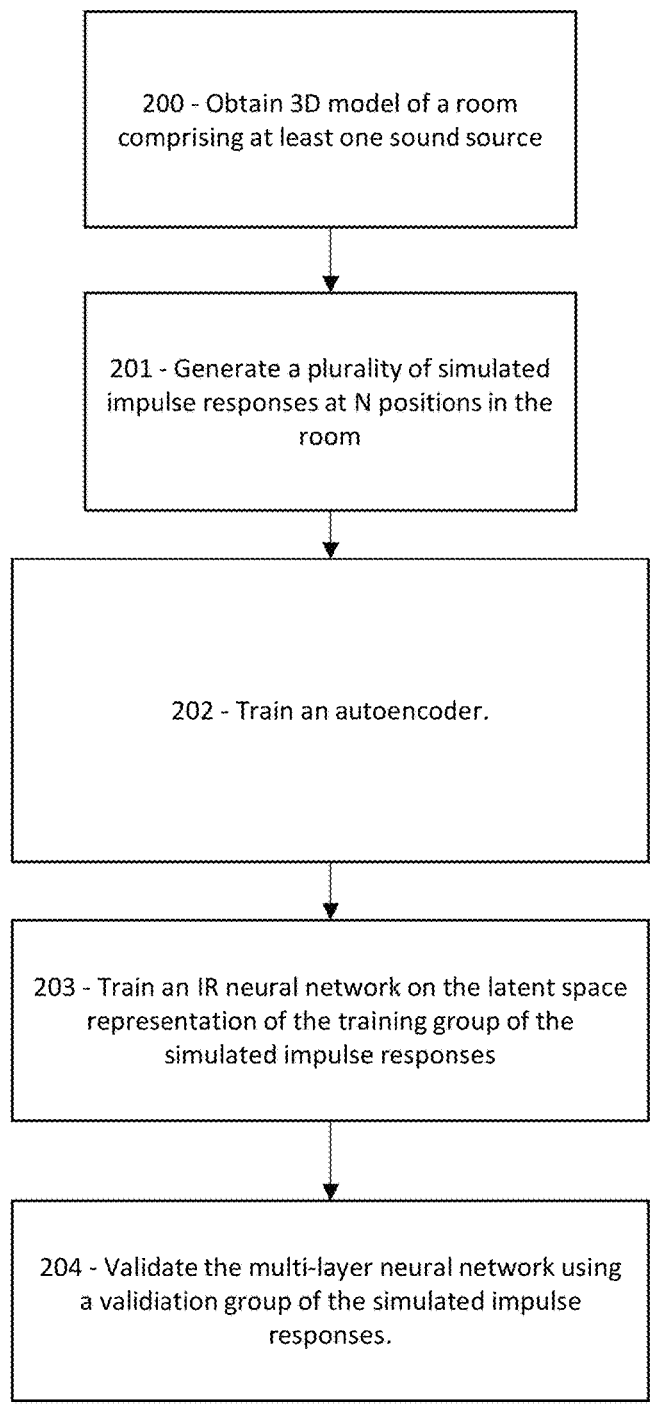
FIG. 2 shows a flow diagram of an embodiment of a method of training a neural network for generating a generated impulse response as disclosed herein.

The coordinates of the listening point 100 is used as input to a trained neural network architecture 101. In the current embodiment the trained neural network architecture 101 is trained based on a specific room geometry and a known sound source arranged in a known position in the room, as will be discussed further with respect to FIG. 2 below.

Based on the listening point as input the trained neural network 101 generates a latent space impulse response 102. The latent space impulse response has a reduced dimension compared to regular impulse responses, or in other words it is generated in a compressed state providing a compressed generated impulse response. Generating the impulse response in the latent space is much faster than generating a full impulse response straight away and thus allow for real time processing.

The latent space impulse response is then passed through a trained decoder 103 which outputs the generated impulse response 104 for the listening point.

An anechoic audio signal 105, representing the sound coming from the sound source is provided. The anechoic audio signal is typically devoid of any reverberation or any other spatial effects. Thus, by convoluting the generated input response 104 and the anechoic audio signal 105 in a convolution step 106 the reverberating audio signal 107 is generated. The reverberating audio signal 107 is the anechoic audio signal including the characteristics of the room as experienced at the listening point.

The reverberating audio signal is played back to the user through the virtual reality headset.

The neural network architecture 101 has been trained to provide a real time and high-fidelity listening experience. The training of the neural network architecture 101 is further discussed with reference to FIG. 2.

In a first step a 3D model of the room comprising at least one sound source is obtained 200. The 3D model may contain information on acoustic properties, e.g., materials for the walls, floor and ceiling. It may include models of the furniture and position and models of doors and windows. Also, several sound sources may be placed in the room and can for example be omni-directional sound source or directional sound sources.

The 3D model and the position of the sound source is used to generate a plurality of simulate impulse responses at N positions in the room 201. The simulation is at least partly wave-based, e.g., using the method disclosed by F. Pind in "Wave-based Virtual Acoustics", 2020, Technical University of Denmark. A wave-based simulation has a high fidelity and in particular at lower and mid acoustic frequencies it will identify interferences and reverberations that other simulation types, such as ray-tracing, will not be able to simulate. However, a wave-based simulation is time-consuming and resource demanding and thus performing it for every potential listening point in the room would take a long time and practically be impossible in real-time.

Performing a predefined number N of simulated impulse responses for respective listening points are generated and used as input in order to train an autoencoder 202.

The autoencoder uses the simulated impulse responses in order to train an encoder part to reduce the dimensions of a training group of the simulated impulse responses to a latent space representation of the training group of the simulated impulse responses. The decoder of the autoencoder is also trained in order to generate return the latent space impulse response back to a full dimension impulse response.

With the autoencoder properly trained an IR neural network is trained on the latent space representations of the simulated impulse responses 203. In principle this trains the IR neural network to generate latent space impulse responses based on the position of the listening point in the known room with known sound source(s).

The trained autoencoder and IR neural network is subsequently validated using a separate group of simulate impulse responses 204 at known positions in the room and any correction to the neural network architecture is performed, e.g., in order to avoid over-fitting.

Example of Training a Neural Network Architecture

In the following an example of training a neural network architecture is disclosed provided in two phases. During the first phase, an autoencoder was trained on simulated IRs in order to compress the simulated IRs and then use the encoder and decoder to transform to and back from latent space representations, i.e., compressed simulated IRs, respectively. In the second phase a neural network was trained on room positions to predict corresponding latent space representations of the autoencoder, i.e., compressed generated IRs.

Synthetic Data Set

Simulated IRs created from the Treble Acoustic Simulation Suite audio simulation tool was used. The simulated IRs were generated for an L-shaped room 300 consisting of 1 sound source 301 and 195 receivers (not shown) in a 2-D plane as shown in FIG. 3. The receivers are not shown for the sake of simplicity, but they are distributed evenly throughout the room. In other embodiments the receivers may be distributed denser in areas where lot of refraction and reflections are expected, e.g., around corners, objects, walls etc and less dense in open space.

The L-shaped room has a size of 33 m2. An impulse length of 1.2 s with an upper frequency of 1420 Hz was computed for the simulated IRs. In the current example one simulated IR signal was generated for each receiver, thus providing 195 simulated IR signals.

The simulations were done using the Discontinuous Galerkin Method (DGM) [1] applied by the Treble Acoustic Simulation Suite audio simulation tool which has been developed to solve wave equation-based problems [2]. The solver used is GPU accelerated and developed to solve the acoustic wave equation for various room acoustics scenarios [3]. The data was split into training and validation sets using an 80/20 split.

The first 2000 data points of each IR signal were used; however, the full IR could be used. Typically, the first part of an IR signal contains the most relevant information, e.g., within the second or third reverberations. Thus, providing a trained network that is only trained on the first part of the IR signal, such as 2000 or more data points or data points corresponding to the second or third reverberation, will generally contain the relevant information and critical characteristics of the IR signal.

However, in another embodiment and not limited to this specific example a second part of the IR signal may also be used. Since this is not as critical as the first part more data points can be compressed. E.g., in one tested example the first part of an IR signals was used to train a first neural network architecture as disclosed herein and a second part of the IR signals were used to train a second neural network architecture as described herein. The first part of the IR signal may have 2000 data points which are compressed to 128 data points, whereas the second part of the IR signal may have 23000 data points which are compressed to 128 data points. Thus, the second part have a lot more data points relative to the first part. Moreover, the two parts may also be compressed differently, e.g., the second part could perhaps be compressed to 256 data points instead of 128 data points. In another example the first part of the IR signal comprises data points describing the first, the second and/or the third reverberation while the second part of the IR signal comprises the remaining data points of the full IR signal.

Autoencoder

An autoencoder 400 as shown in FIG. 4 was trained on the simulated IRs, each consisting of 2000 data points. The encoder part 401, transformed the simulated impulse responses with a dimension of 2000 to a latent space of 128 thus providing compressed simulated IRs. The decoder part 402 of the autoencoder is responsible for transforming latent space representation, e.g., compressed simulated IR or compressed generated IR, to an IR signal, e.g., a respective uncompressed simulated IR or generated IR.

IR Neural Network for Predicting IRs

Figure 5:
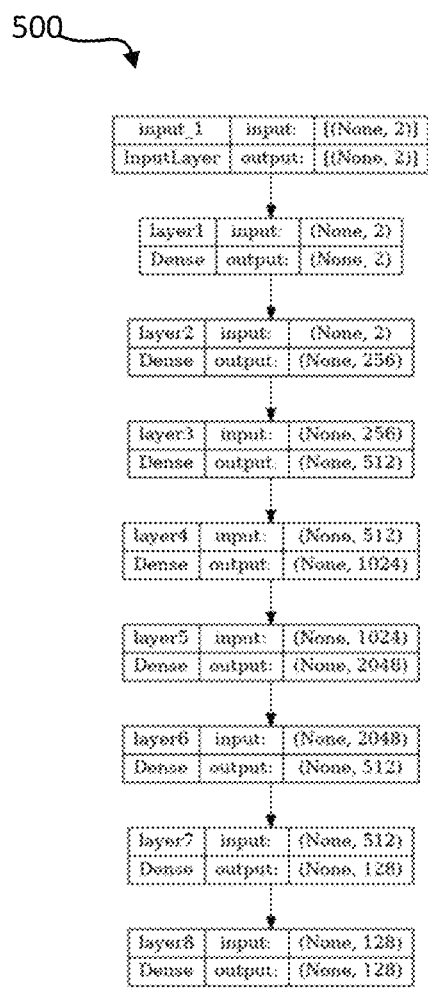
FIG. 5 shows the structure of an embodiment of an IR neural network as disclosed herein.

An artificial IR neural network 500, as shown in FIG. 5, of seven (7) layers was trained on X, Y coordinates in the room (Z is fixed) to predict a latent space representation of the IR. It consisted of layers varying between 2048 and 256 neurons. It was trained for 5000 epochs on the same data, i.e., simulated IRs, as the autoencoder but now transformed into latent space, i.e., compressed simulated IRs. The predicted representation was then transformed to the corresponding uncompressed simulated IR signal using the decoder part of the autoencoder.

Results

The autoencoder was trained using 10-fold cross validation for 1 000 epochs. The training resulted in a Mean Squared Error (MSE) of the validation set of 1.4e-05, i.e., when comparing the simulated IRs and the corresponding uncompressed simulated IRs of the validation set. This indicates a very promising encoding and decoding of the simulated IRs in particular as the dimension of IR signals has been reduced by 93.6% by using the latent space as a representation which allows for real-time generation of IRs for random X, Y coordinates in the room.

Both the autoencoder and the fully connected feedforward neural network was constructed using Tensorflow [4] and Keras [5].

The fully connected forward feed neural network responsible for predicting latent space representations of IR signals using room coordinates was trained for 5000 epochs with a resulting Mean Squared Error (MSE) of 1.09e-4 for the simulated IRs and the uncompressed simulated IRs (using the decoder of the above trained autoencoder) of the validation set.

Thus, a compressed generated IR signal for an unseen location in the room can be generated by supplying the X and Y coordinates of the receiver position to the IR neural network. The decoder part of the autoencoder was then used to return the corresponding generated IR signal.

Figure 6:
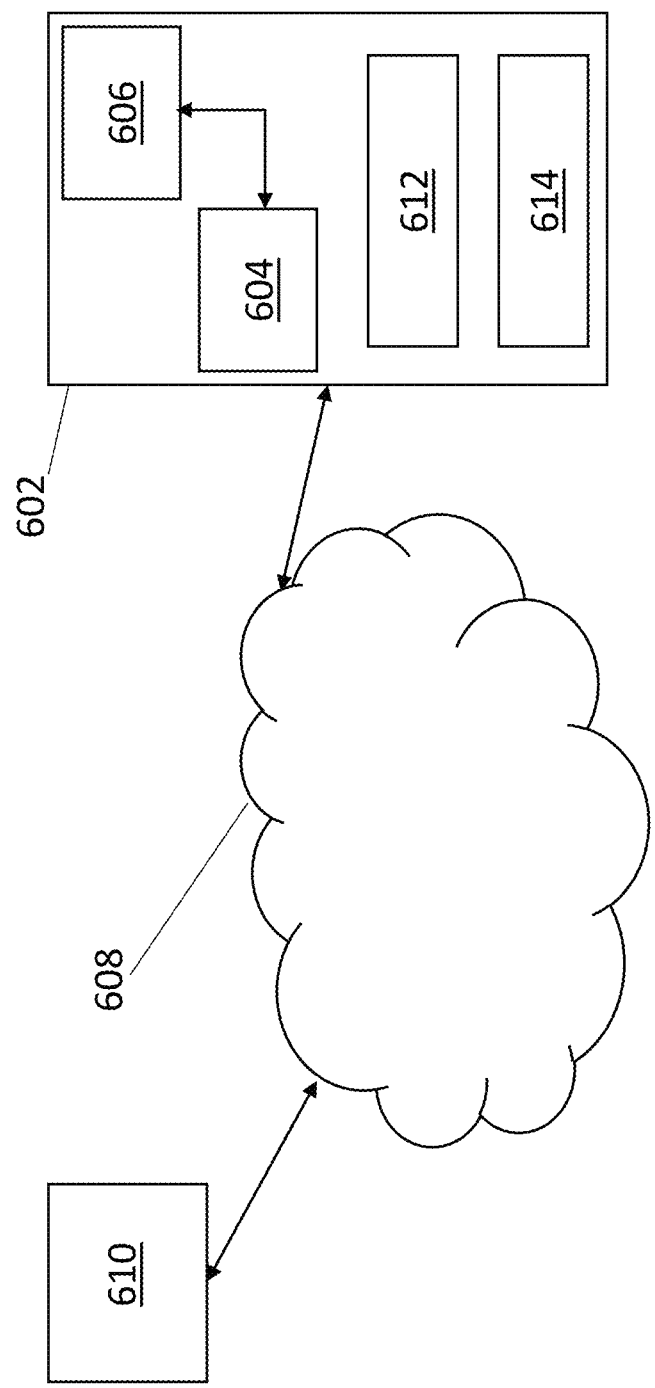
FIG. 6 shows a system for generating a reverberating audio signal representing the sound from at least one sound source in accordance with an embodiment of the present invention.

FIG. 6 shows a system 600 for generating a reverberating audio signal representing the sound from at least one sound source in accordance with an embodiment of the present invention. System 600 includes a computer system 602. Computer system 602 includes specialized hardware and/or software modules that execute on a processor 604 coupled to a memory 606. The computer system 602 may also be communicatively coupled to a communications network 608. Network 608 may be a public network, such as the internet, or it may be a private network, such as a network internal to a company. Network 608 also may be a combination of public and/or private networks. The computer system 602 may be coupled to the network 608 directly, for example via an Ethernet cable or via wireless connection such as Wi-Fi. Computer system 602 may also be coupled to the network 608 in any other way known to the skilled person, for example indirectly through another device (not shown), such, as, but not limited to, a router, a switch, a hub, a separate computer system, a mobile device, a modem, and/or a combination of these devices. The processor 604 is configured to execute the methods described above in detail with reference to FIGS. 1 and 2.

The computer system 102 further includes an impulse response generation module 612 and a neural network training module 614, both executing on processor 604. The impulse generation module 612 is configured to execute the method described above in detail with reference to FIG. 1, and the neural network training module 614 is configured to execute the method described above in detail with reference to FIG. 2. In some embodiments, modules 612 and 614 are specialized sets of computer software instructions programmed onto one or more dedicated processors in computer system 602 and can include specifically designed memory locations and/or registers for executing the specialized computer software instructions.

Although modules 612 and 614 are shown in FIG. 6 as executing within the same computer system 602, it is expressly noted that the functionality of modules 612 and 614 can be distributed among a plurality of computer systems. Computer system 602 enables modules 612 and 614 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of modules 612 and 614 is described in detail throughout the specification.

Further coupled to the network 608 as shown in FIG. 6, or included in computer system 602, is a neural network architecture 610. The neural network architecture 610 may be a single architecture or it may be a combination of a plurality of neural network architectures. For example, the neural network architecture 610 may include a first neural network architecture and a second neural network architecture that are different entities. The neural network architecture 610 is configured to provide and/or execute the functions described in detail above. Illustratively, the neural network architecture 610 may substantially correspond to the trained neural network architecture 101 described above with reference to FIG. 1. The neural network architecture 610 may further provide the autoencoder and IR neural network as described in detail above. The neural network architecture 610 may be coupled to the network 608 as shown here and communicate with computer system 602 over the network 608, but it is also expressly contemplated that the neural network architecture is part of computer system 602. The impulse generation module 612 and the neural network training module 614 communicate with the neural network architecture 610 in order to exchange data for the purpose of performing their described functions. It is also expressly noted that the functionality of the neural network architecture 610 may be distributed among a plurality of computer systems. Similar to what is noted above with reference to modules 612 and 614, any number of computing devices, arranged in a variety of architectures, resources, and configurations may be used without departing from the scope of the invention.

REFERENCES

[1] W. H. Reed and T. R. Hill, "Triangular mesh methods for the neutron transport equation," tech. rep., Los Alamos Scientific Lab., N. Mex. (USA), 1973.

[2] M. Kaser and M. Dumbser, "An arbitrary high-order discontinuous galerkin method for elastic waves on unstructured meshes—i. the two-dimensional isotropic case with external source terms," Geophysical Journal International, vol. 166, no. 2, pp. 855-877, 2006.

[3] F. Pind, C.-H. Jeong, A. P. Engsig-Karup, J. S. Hesthaven, and J. Strømann-Andersen, "Time-domain room acoustic simulations with extended-reacting porous absorbers using the discontinuous galerkin method," The Journal of the Acoustical Society of America, vol. 148, no. 5, pp. 2851-2863, 2020.

[4] M. Abadi, P. Barham, J. Chen, Z. Chen, A. Davis, J. Dean, M. Devin, S. Ghemawat, G. Irving, M. Isard, M. Kudlur, J. Levenberg, R. Monga, S. Moore, D. G. Murray, B. Steiner, P. Tucker, V. Vasudevan, P. Warden, M. Wicke, Y. Yu, and X. Zheng, "Tensorflow: A system for large-scale machine learning," 2016.

[5] N. Ketkar and N. Ketkar, "Introduction to keras," Deep learning with python: a hands-on introduction, pp. 97-111, 2017.

The invention claimed is:

1. A computer-implemented method for generating an impulse response (IR) representing a sound wave propagation from at least one sound source received at a listening point in a room, the method comprising:
  obtaining a generated impulse response at the listening point in the room from a neural network architecture by providing to the neural network architecture at least a position of the listening point as input, wherein the generated impulse response is generated using the neural network architecture trained according to:
    obtaining a 3D model of the room comprising the at least one sound source virtually emitting sound in the room; and
    obtaining a training group of simulated impulse responses, wherein each simulated impulse response is generated for a respective predefined listening point in the 3D model of the room;
  training an autoencoder, the training comprising:
    training an encoder of the autoencoder by using the training group of simulated impulse responses as input in order to obtain a corresponding training group of compressed simulated impulse responses as outputs; and training a decoder of the autoencoder by using the training group of compressed impulse responses as input in order to obtain a corresponding training group of uncompressed simulated impulse responses as outputs; and training an IR neural network using the training group of compressed simulated impulse responses of the autoencoder and the corresponding positions of the predefined listening points as input.

2. The method according to claim 1, wherein obtaining the generated impulse response further comprises:
generating a compressed generated impulse response using the IR neural network; and
generating the generated impulse response by using the decoder of the trained autoencoder to decompress the compressed generated impulse response.

3. The method according to claim 1, wherein training the neural network architecture further comprises:
obtaining a validation group of simulated impulse responses, wherein each simulated impulse response is generated for a respective predefined listening point in the 3D model of the room, wherein each of the simulated impulse responses is generated using at least a wave-based solver; and
validating the autoencoder and the neural network using the validation group of simulated impulse responses, wherein the validation group of simulated impulse responses is different from the training group of simulated impulse responses.

4. The method according to claim 1, wherein training the IR neural network comprises using the 3D model of the room as input.

5. The method according to claim 1, wherein training the IR neural network comprises using at least one of a position and a directivity of at least one sound source as input.

6. The method according to claim 1, wherein the simulated impulse responses are generated using at least a wave-based solver.

7. The method according to claim 1, further comprising:
generating a reverberating audio signal received at the listening point in the room by:
obtaining the generated impulse response;
obtaining an anechoic audio signal; and
generating the reverberating audio signal received at the listening point by convolving the anechoic audio signal and the generated impulse response.

8. The method according to claim 1, wherein the method further comprises generating a first part of the generated impulse response using a first neural network architecture, wherein a first part of the simulated impulse responses is obtained, and wherein the first part includes a predetermined set of first data points.

9. The method according to claim 8, wherein the predetermined set of first data points corresponds to at least one of a first, second, and third reverberation of the simulated impulse response.

10. The method according to claim 8, wherein the predetermined set of first data points includes at least 2000 data points.

11. The method according to claim 8, wherein the method further comprises generating a second part of the generated impulse response using a second neural network architecture, wherein a second part of the simulate impulse response is obtained, and wherein the second part includes a predetermined set of second data points.

12. The method according to claim 11, wherein the predetermined set of second data points corresponds to a second reverberation following a first reverberation corresponding to the set of first data points.

13. The method according to claim 11, wherein the first part of the generated impulse response and the second part of the generated impulse response are combined into a combined generated impulse response.

14. A computer implemented method for training a neural network architecture to generate an impulse response signal for a position in a 3D model of a room, the method comprising:
obtaining a 3D model of the room comprising at least one sound source virtually emitting sound in the room;
obtaining a training group of simulated impulse responses, wherein each simulated impulse response is generated for a respective predefined listening point in the 3D model of the room;
training an autoencoder, the training comprising:
training an encoder of the autoencoder by using the training group of simulated impulse responses as input in order to obtain a corresponding training group of compressed simulated impulse response as outputs; and
training a decoder of the autoencoder by using the training group of compressed impulse responses as input in order to obtain a corresponding training group of uncompressed simulated impulse response as outputs; and
training an IR neural network using the training group of compressed simulated impulse responses of the autoencoder and the corresponding position of the predefined listening points as input.

15. A system for generating an impulse response representing a sound wave propagation from at least one sound source received at a listening point in a room, the system comprising a computer system having processing circuitry coupled to a memory, and a neural network architecture coupled to the computer system, wherein the processing circuitry is configured to:
obtain a generated impulse response at the listening point in the room from the neural network architecture by providing to the neural network architecture at least a position of the listening point as input, wherein the generated impulse response is generated using the neural network architecture trained according to:
obtaining a 3D model of the room comprising the at least one sound source virtually emitting sound in the room; and
obtaining a training group of simulated impulse responses, wherein each simulated impulse response is generated for a respective predefined listening point in the 3D model of the room;
training an autoencoder, the training comprising:
training an encoder of the autoencoder by using the training group of simulated impulse responses as input in order to obtain a corresponding training group of compressed simulated impulse responses as outputs; and
training a decoder of the autoencoder by using the training group of compressed simulated impulse responses as input in order to obtain a corresponding training group of uncompressed simulated impulse responses as outputs; and
training an IR neural network using the training group of compressed simulated impulse responses of the autoencoder and the corresponding positions of the predefined listening points as input.

16. The system according to claim 15, wherein the processing circuitry is further configured to:
- generate a compressed generated impulse response using the IR neural network; and
- generate the generated impulse response by using the decoder of the trained autoencoder to decompress the compressed generated impulse response.

17. The system according to claim 15, wherein the processing circuitry is further configured to obtain an anechoic audio signal and to generate a reverberating audio signal received at the listening point by convolving the anechoic audio signal and the generated impulse response.

18. The system according to claim 15, wherein the neural network architecture includes a first neural network architecture and wherein processing circuitry is configured to generate a first part of the generated impulse response using the first neural network architecture, wherein a first part of the simulated impulse responses is obtained, and wherein the first part includes a predetermined set of first data points.

19. The system according to claim 18, wherein the neural network architecture further includes a second neural network architecture, and wherein the processing circuitry is further configured to generate a second part of the generated impulse response using the second neural network architecture, and wherein a second part of the simulated impulse responses is obtained and wherein the second part includes a predetermined set of second data points.

20. The system according to claim 19, wherein the processing circuitry is further configured to combine the first part of the generated impulse responses and the second part of the generated impulse responses into a combined generated impulse response.

* * * * *